United States Patent
Henig et al.

(10) Patent No.: US 9,572,228 B2
(45) Date of Patent: Feb. 14, 2017

(54) COMMISSIONING LIGHTING SYSTEMS

(71) Applicant: Redwood Systems, Inc., Fremont, CA (US)

(72) Inventors: Robert Henig, Palo Alto, CA (US);
David Fowler, Union City, CA (US);
Deepak Nulu, Milpitas, CA (US);
David Leonard, Danville, CA (US);
Carl P. Zwanzig, Alameda, CA (US)

(73) Assignee: Redwood Systems, Inc., Fremont, CA (US)

( * ) Notice: Subject to any disclaimer, the term of this patent is extended or adjusted under 35 U.S.C. 154(b) by 0 days.

(21) Appl. No.: 14/593,073

(22) Filed: Jan. 9, 2015

(65) Prior Publication Data

US 2015/0115805 A1    Apr. 30, 2015

Related U.S. Application Data

(63) Continuation-in-part of application No. 13/025,389, filed on Feb. 11, 2011, now Pat. No. 8,981,913, which is a continuation-in-part of application No. 12/708,460, filed on Feb. 18, 2010, now abandoned.

(51) Int. Cl.
*H05B 33/06* (2006.01)
*H05B 37/02* (2006.01)

(52) U.S. Cl.
CPC ...... *H05B 37/0218* (2013.01); *H05B 37/0227* (2013.01); *H05B 37/0272* (2013.01); *Y02B 20/46* (2013.01)

(58) Field of Classification Search
None
See application file for complete search history.

(56) References Cited

U.S. PATENT DOCUMENTS

| | | | |
|---|---|---|---|
| 4,236,145 A | 11/1980 | Schorsch | |
| 4,425,628 A | 1/1984 | Bedard et al. | |
| 4,564,927 A | 1/1986 | Kolb | |
| 4,839,562 A | 6/1989 | Francis et al. | |
| 5,060,124 A | 10/1991 | Crispin et al. | |

(Continued)

FOREIGN PATENT DOCUMENTS

| | | |
|---|---|---|
| DE | 202 08 061 U1 | 9/2002 |
| DE | 102008056164 A1 | 2/2010 |

(Continued)

OTHER PUBLICATIONS

Pigg et al., "Behavioral Aspects of Lighting and Occupancy Sensors in Private Offices: A Case Study of a University Office Building," dated no later than Dec. 31, 1996, 10 pgs., U.S. Patent and Trademark Office, Alexandria VA.

(Continued)

*Primary Examiner* — Crystal L Hammond
(74) *Attorney, Agent, or Firm* — Myers Bigel, P.A.

(57) ABSTRACT

Commissioning a lighting system is disclosed. A user can be provided with a pointing device capable of emitting or returning a signal which can be received by detectors co-located with each fixture in the lighting system. The user can add a fixture to a group by aiming the pointing device at the fixture when the fixture is not assigned to the group, and the user can remove a fixture from a group in the same way when the fixture was previously assigned to the group. Additional user gestures are also disclosed.

20 Claims, 4 Drawing Sheets

(56) References Cited

U.S. PATENT DOCUMENTS

| | | | |
|---|---|---|---|
| 5,061,997 A | 10/1991 | Rea et al. | |
| 5,187,655 A | 2/1993 | Post et al. | |
| 5,191,265 A * | 3/1993 | D'Aleo et al. | H05B 37/02 315/295 |
| 5,293,097 A | 3/1994 | Elwell | |
| 5,406,173 A | 4/1995 | Mix et al. | |
| 5,426,425 A | 6/1995 | Conrad et al. | |
| 5,455,487 A | 10/1995 | Mix et al. | |
| 5,498,931 A | 3/1996 | Bedocs | |
| 5,598,000 A | 1/1997 | Popat | |
| 5,598,042 A | 1/1997 | Mix et al. | |
| 5,652,927 A | 7/1997 | McIntyre | |
| 5,668,446 A * | 9/1997 | Baker | H05B 37/02 315/158 |
| 5,701,058 A | 12/1997 | Roth | |
| 5,834,765 A | 11/1998 | Ashdown | |
| 5,892,903 A | 4/1999 | Klaus | |
| 5,946,209 A | 8/1999 | Eckel et al. | |
| 5,962,992 A | 10/1999 | Huang et al. | |
| 5,984,513 A | 11/1999 | Baldwin | |
| 6,002,427 A | 12/1999 | Kipust | |
| 6,043,477 A | 3/2000 | Timmermans | |
| 6,046,550 A | 4/2000 | Ference et al. | |
| 6,211,626 B1 * | 4/2001 | Lys et al. | A61N 5/0616 315/291 |
| 6,230,137 B1 | 5/2001 | Has et al. | |
| 6,327,708 B1 | 12/2001 | Monsees | |
| 6,380,928 B1 | 4/2002 | Todd | |
| 6,421,525 B1 | 7/2002 | Prewitt | |
| 6,466,234 B1 | 10/2002 | Pyle et al. | |
| 6,528,954 B1 * | 3/2003 | Lys | A61N 5/0616 315/158 |
| 6,548,967 B1 | 4/2003 | Dowling et al. | |
| 6,601,767 B1 | 8/2003 | Gu et al. | |
| 6,640,142 B1 | 10/2003 | Wong et al. | |
| 6,795,808 B1 | 9/2004 | Strubbe et al. | |
| 7,027,736 B1 | 4/2006 | Mier-Langner et al. | |
| 7,038,398 B1 * | 5/2006 | Lys | B60Q 1/2696 315/291 |
| 7,049,976 B2 | 5/2006 | Hunt et al. | |
| 7,054,233 B2 | 5/2006 | Kibiloski et al. | |
| 7,190,126 B1 | 3/2007 | Paton | |
| 7,236,154 B1 | 6/2007 | Kerr et al. | |
| 7,307,542 B1 | 12/2007 | Chandler et al. | |
| 7,315,036 B2 | 1/2008 | Ford et al. | |
| 7,519,703 B1 | 4/2009 | Stuart et al. | |
| 7,809,448 B2 | 10/2010 | Lys et al. | |
| 7,935,934 B2 | 5/2011 | Komatsubara | |
| 8,214,651 B2 | 7/2012 | Anemikos et al. | |
| 8,215,541 B2 | 7/2012 | Bucher et al. | |
| 8,280,558 B2 | 10/2012 | Picco | |
| 8,300,577 B2 | 10/2012 | Simons et al. | |
| 8,319,721 B2 | 11/2012 | Edwards et al. | |
| 2002/0071161 A1 | 6/2002 | Perkins et al. | |
| 2002/0140360 A1 | 10/2002 | Crenshaw | |
| 2002/0175639 A1 | 11/2002 | Pitigoi-Aron | |
| 2003/0015302 A1 | 1/2003 | Pessina et al. | |
| 2003/0057887 A1 | 3/2003 | Dowling et al. | |
| 2003/0107888 A1 | 6/2003 | Devlin et al. | |
| 2003/0127998 A1 | 7/2003 | Notarianni et al. | |
| 2003/0139134 A1 | 7/2003 | Bailey et al. | |
| 2003/0193405 A1 | 10/2003 | Hunt et al. | |
| 2003/0210167 A1 | 11/2003 | Weng | |
| 2003/0222587 A1 | 12/2003 | Dowling et al. | |
| 2003/0227220 A1 | 12/2003 | Biskup, Jr. et al. | |
| 2004/0002792 A1 | 1/2004 | Hoffknecht | |
| 2004/0195494 A1 | 10/2004 | Kok et al. | |
| 2004/0217718 A1 | 11/2004 | Kumar et al. | |
| 2005/0025480 A1 | 2/2005 | Yeh | |
| 2005/0057484 A1 | 3/2005 | Diefenbaugh et al. | |
| 2005/0097162 A1 | 5/2005 | Budike, Jr. | |
| 2005/0110416 A1 | 5/2005 | Veskovic | |
| 2005/0113978 A1 | 5/2005 | Sharma et al. | |
| 2005/0174473 A1 | 8/2005 | Morgan et al. | |
| 2005/0179706 A1 | 8/2005 | Childers | |
| 2005/0281030 A1 | 12/2005 | Leong et al. | |
| 2006/0092407 A1 | 5/2006 | Tan et al. | |
| 2006/0103549 A1 | 5/2006 | Hunt et al. | |
| 2006/0104081 A1 | 5/2006 | Fraval | |
| 2006/0146169 A1 | 7/2006 | Segman | |
| 2006/0202851 A1 | 9/2006 | Cash et al. | |
| 2007/0024125 A1 | 2/2007 | Biskup, Sr. et al. | |
| 2007/0085157 A1 | 4/2007 | Fadell et al. | |
| 2007/0108389 A1 | 5/2007 | Makela et al. | |
| 2007/0273307 A1 | 11/2007 | Westrick et al. | |
| 2008/0088181 A1 | 4/2008 | Cash et al. | |
| 2008/0088435 A1 | 4/2008 | Cash et al. | |
| 2008/0129529 A1 | 6/2008 | Ford et al. | |
| 2008/0165116 A1 | 7/2008 | Herz et al. | |
| 2008/0183337 A1 | 7/2008 | Szabados | |
| 2008/0186720 A1 | 8/2008 | Verbrugh | |
| 2008/0215391 A1 | 9/2008 | Dowling et al. | |
| 2008/0218087 A1 | 9/2008 | Crouse et al. | |
| 2008/0258633 A1 | 10/2008 | Voysey | |
| 2008/0265802 A1 | 10/2008 | Van de Sluis et al. | |
| 2008/0277486 A1 | 11/2008 | Seem et al. | |
| 2008/0297068 A1 | 12/2008 | Koren et al. | |
| 2009/0023425 A1 | 1/2009 | Hosain et al. | |
| 2009/0033460 A1 | 2/2009 | Mack et al. | |
| 2009/0094317 A1 | 4/2009 | Venkitaraman | |
| 2009/0109052 A1 | 4/2009 | Stepps et al. | |
| 2009/0167676 A1 | 7/2009 | Edwards et al. | |
| 2009/0173842 A1 | 7/2009 | Lawson et al. | |
| 2009/0218951 A1 | 9/2009 | Weaver | |
| 2009/0230894 A1 | 9/2009 | De Goederen et al. | |
| 2009/0236910 A1 | 9/2009 | Yamada et al. | |
| 2009/0243517 A1 | 10/2009 | Verfuerth et al. | |
| 2009/0267540 A1 | 10/2009 | Chemel et al. | |
| 2009/0271042 A1 | 10/2009 | Voysey | |
| 2009/0273433 A1 | 11/2009 | Rigatti et al. | |
| 2010/0011211 A1 | 1/2010 | Anemikos et al. | |
| 2010/0088970 A1 | 4/2010 | Miller | |
| 2010/0188009 A1 | 7/2010 | Bull | |
| 2010/0207879 A1 | 8/2010 | Fadell et al. | |
| 2010/0214948 A1 | 8/2010 | Knibbe et al. | |
| 2010/0244746 A1 | 9/2010 | Van De Sluis et al. | |
| 2010/0250481 A1 | 9/2010 | Tomastik | |
| 2010/0277270 A1 | 11/2010 | Aikens et al. | |
| 2010/0327766 A1 | 12/2010 | Recker et al. | |
| 2011/0031897 A1 | 2/2011 | Henig et al. | |
| 2011/0043035 A1 | 2/2011 | Yamada et al. | |
| 2011/0080091 A1 | 4/2011 | Staab et al. | |
| 2011/0135317 A1 | 6/2011 | Chaplin | |
| 2011/0140832 A1 | 6/2011 | Vinkenvleugel et al. | |
| 2011/0199020 A1 | 8/2011 | Henig et al. | |
| 2011/0202151 A1 | 8/2011 | Covaro et al. | |
| 2011/0234366 A1 | 9/2011 | Feng et al. | |
| 2011/0309769 A1 | 12/2011 | Kuroki et al. | |
| 2012/0013257 A1 * | 1/2012 | Sibert | H05B 37/0245 315/152 |
| 2012/0050307 A1 | 3/2012 | Mahowald et al. | |
| 2012/0102235 A1 | 4/2012 | Zueger et al. | |

FOREIGN PATENT DOCUMENTS

| | | |
|---|---|---|
| WO | WO 03/078894 A1 | 9/2003 |
| WO | WO 2006/048916 A2 | 5/2006 |
| WO | WO 2006/095316 A1 | 9/2006 |
| WO | WO 2006/099422 A2 | 9/2006 |
| WO | WO 2007/132382 A2 | 11/2007 |
| WO | WO 2009/150581 A1 | 12/2009 |

OTHER PUBLICATIONS

Waybackmachine Screen Shot dated Nov. 22, 2009, pp. 1-3, Redwood Systems, available at http://web.archive.org/web/20091122045359/http://redwoodsystems.com.

(56) References Cited

OTHER PUBLICATIONS

Sailors, John, "Redwood Systems in Fremont networks LEDs for a brighter future," Sep. 22, 2010, pp. 1-4, Silicon Valley/San Jose Business Journal, San Jose CA.

* cited by examiner

COMMISSIONING LIGHTING SYSTEMS

This application claims priority under 35 U.S.C. §120 as a continuation of U.S. patent application Ser. No. 13/025,389, filed Feb. 11, 2011, which in turn claims priority under 35 U.S.C. §120 as a continuation-in-part of U.S. patent application Ser. No. 12/708,460, filed Feb. 18, 2010, the entire contents of each of which are incorporated by reference herein.

BACKGROUND

1. Technical Field

One or more embodiments of the present invention relate to lighting systems and functional groups of fixtures in a lighting system.

2. Related Art

Lighting systems for areal illumination may comprise (1) a set of "luminaires" (light fixtures comprising mounting hardware and one or more light-emitting components, such as incandescent or fluorescent bulbs or arrays of light-emitting diodes [LEDs]), together with (2) one or more sensor components (motion sensors, light sensors, and the like), (3) control devices (such as dimmers and switches), and (4) power drivers to set the output light level of each luminaire as a function of sensor outputs and control device settings. Such systems can range in complexity from a single wall switch and bulb to commercial building lighting systems comprising hundreds of luminaires, sensors, and control devices.

One way to specify, configure, and install such systems involves the use of discrete components, where each of the components in the systems are purchased separately, and the control logic is implemented by the way the components are connected together using wired or wireless connections. Thus, each component may be separately purchased, installed, and wired together in order to create functional groups. Alternatively or in addition, certain components can be physically grouped. For example, an outdoor security light fixture can have a motion sensor built into the outdoor security light fixture, or a table lamp can have an on/off switch built in. However, such combinations may not be used, and each component is separately purchased, installed, and wired together in order to create functional groups.

As the total number of components in a lighting system increases, sophisticated control systems may be desirable. A sophisticated control system may be implemented using electronic control systems, which may include custom electronics or software running on a more general-purpose control device such as a digital computer. A trained engineer may manually connect devices in the control system, provide a description of the system to the control system hardware and software, and identify the control functions to be implemented.

The cost of discrete components as well as the cost of installation and programming labor may have inhibited wide-spread adoption of sophisticated control systems. Nevertheless, cast savings and performance benefits may be realized by intelligently managing the on-time and on-intensity of each light source within lighting systems. Potential saving in electricity usage may be large, and safety and security can be enhanced. Thus, for wide-spread adoption of sophisticated control systems, it may be desirable for the components to be inexpensive, the installation to be quick and easy, and configuration work to be possible within the skill range of an average commercial electrician or that of building maintenance personnel.

In order to reduce installation and commissioning costs as well as the skill level required to implement these tasks, it is possible to automate some of the commissioning steps. For example, co-owned and co-pending U.S. patent application Ser. No. 12/538,806, filed Aug. 10, 2009, entitled LIGHTING SYSTEMS AND METHODS OF AUTO-COMMISSIONING, the entire contents of which is incorporated by reference, discloses ways of auto-commissioning a lighting system by using signal sources and sensors supplied with each fixture in order to automatically determine proximity of fixtures to each other and to automatically create logical groups of fixtures. Whether or not such auto-commissioning is used, further manual configuration of the lighting system may be desirable. For example, at least two people with cell phones or walkie-talkies may coordinate with each other in the commissioning of fixtures with control systems by creating or modifying groups. A first person may operate a control station and a second person may move around a building and report where the second person is in the building. The second person may also report observed lighting behavior in order to determine which lights are controlled by what logical entity in a user interface of the control system.

Handheld programming devices have been used to aid in programming the operations of lighting systems. For example, Cash, et al. (U.S. Patent Application Publication No. 2006/0202851) discloses the use of a handheld device to program various configuration parameters for a fluorescent lighting system. The handheld device described in U.S. Patent Application Publication No. 2006/0202851 may communicate via an infrared link to a receiver located on a lighting "bus" to which several programmable ballasts for driving fluorescent tubes are also attached.

SUMMARY OF THE INVENTION

A system for commissioning a lighting system may be provided that includes a pointing device, sensors, and a control unit. The pointing device may emit signals, such as visible light or audio signals. Each one of the sensors may be associated with a corresponding fixture, such as a light fixture. Each one of the sensors may be capable of receiving signals from the pointing device. The control unit may assign one of the fixtures to a group of the fixtures in response to receipt by the sensor associated with the fixture of a signal emitted by the pointing device.

A computer readable medium for commissioning a lighting system may also be provided that includes instructions executable to receive data from sensors, where each one of the sensors may be associated with a corresponding fixture. The medium may also include instructions executable to assign a fixture to a group of fixtures in response to receipt of data from one of the sensors associated with the fixture, where the data indicates that the sensor received a signal from the pointing device.

A method may also be provided for commissioning a lighting system. Data from sensors may be received, where each one of the sensors is associated with a corresponding fixture. Data may be received from one of the sensors that indicates the sensor received a signal from a pointing device. In response, a fixture associated with the sensor may be assigned to a group of fixtures.

A method of commissioning a lighting system is disclosed. A user can be provided with a pointing device capable of emitting or returning a signal which can be received by detectors co-located with each fixture in the lighting system. The user can add a fixture to a group by aiming the pointing device at the fixture when the fixture is not assigned to the group, and the user can remove a fixture from a group in the same way when the fixture was previously assigned to the group. This commissioning method can be used with a lighting system comprising a central control unit and a plurality of fixtures comprising luminaires, optional control devices, and optional standalone sensors, where each fixture includes a co-located sensor capable of receiving the signal emitted by the pointing device, and a central control unit which can communicate with each fixture. Additional user gestures are disclosed together with methods for the central control unit to acknowledge gestures. Additional communications methods among components of the lighting system are also disclosed. Further objects and advantages of the present invention will be apparent from the following description, reference being made to the accompanying drawings.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 4 illustrates an example flow diagram of the logic of a system for commissioning the fixtures 220 with a walk-through.

DETAILED DESCRIPTION

Figure 1:
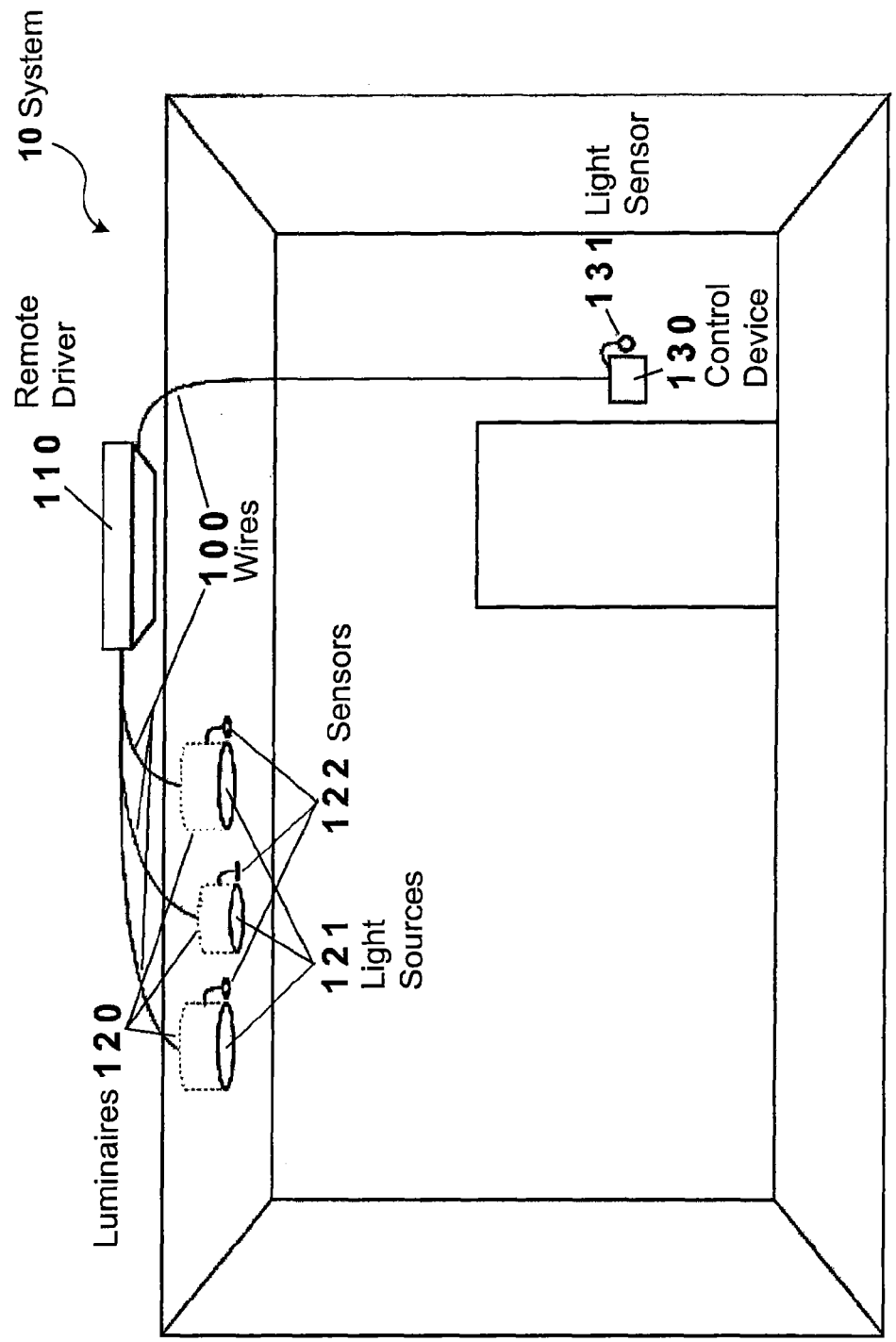
FIG. 1 illustrates an example of a lighting system that includes a remote driver.

Before the present invention is described in detail, it is to be understood that unless otherwise indicated this invention is not limited to specific construction materials, electronic components, or the like, as such may vary. It is also to be understood that the terminology used herein is for the purpose of describing particular embodiments only and is not intended to limit the scope of the present invention.

As used herein and in the claims, the singular forms "a," "an" and "the" may include plural referents unless the context clearly dictates otherwise. Thus, for example, reference to "a fixture" may include one or more fixtures; reference to "a sensor" may include one or more sensors, and so forth.

Where a range of values is provided, it is understood that each intervening value, to the tenth of the unit of the lower limit unless the context clearly dictates otherwise, between the upper and lower limit of that range, and any other stated or intervening value in that stated range, may be encompassed within the range of values. The upper and lower limits of these smaller ranges may independently be included in the smaller ranges, and may be encompassed within the range of values, subject to any specifically excluded limit in the stated range. Where the stated range includes one or both of the limits, ranges excluding either or both of those included limits may also be included in the range of values.

Embodiments of the present invention can be used with various supersets and subsets of the exemplary components described herein. For concreteness, embodiments of the invention may be described in the context of a commercial building illumination system comprising a set of LED luminaires, but the invention is not limited to the use of LEDs as light sources nor to use in illuminating buildings.

A lighting system may comprise fixtures, sensors, and at least one central control unit that receives information from the sensors and controls and determines the output light level for each light source in the fixtures. The light level may vary from zero to a maximum value (a non-zero light level that is limited by a maximum sustainable operating point for the light source). The lighting system may include different, fewer, or additional components. Certain embodiments, such as those using fluorescent light sources, may use local "ballasts" that each individually provide power control for one light source, and the central control unit provides a signal to instruct each local ballast to set a particular light level. In other embodiments, such as those using LED luminaires, the central control unit may include a remote driver that powers each luminaire or light source. As used herein, a "fixture" may include a luminaire, a standalone control or sensor, or any other electrical device. A "luminaire" may include a light fixture that includes a light source and suitable mounting hardware. In some examples, luminaires may further include light sensors designed to sense light from the light sources of adjacent luminaires, such as either via direct transmission of light or via reflection of light from the area under illumination. Alternatively or in addition, the luminaires may include additional signal sources and matching sensors using other wavelengths of light or other signal source/sensor technologies.

FIG. 1 illustrates an example of a lighting system 10 that includes the remote driver 110. The lighting system 10 may comprise a communications means to facilitate communication between the remote driver 110 and each fixture 120, 122, 130, and 131. Such means can include direct wired connections, or any other known communications means such as optical fibers, wireless (radio frequency), ultrasonic or other audio-based communication, infrared, any other communication mechanism, or a combination thereof. Although a single room is illustrated in FIG. 1, the fixtures 120, 122, 130, and 131 may be installed in any number of rooms or locations. The fixtures may be connected by wires 100, for example, to the remote driver 110. The remote driver 110, which is shown located above a ceiling, may be located in any other suitable location, such as in a closet, a utility shaft, outside the room or even outside a building. In the example illustrated in FIG. 1, the system 10 includes three luminaires 120, the remote driver 110, a control device 130, and a light sensor 131 co-located with the control device 130. Each one of the luminaires 120 may comprise a light source 121 and a light sensor 122. The control device 130 may include any device that receives input from a user, such as a dimmer, a switch, a touchpad, a button, or any other such device. The control device 130 may or may not be co-located with the light sensor 131. The control device 130 may comprise, for example, a wall controller (a dimmer or switch) co-located with the additional light sensor 131.

In some examples, each luminaire may include or be co-located with at least one sensor and one signal source. The light source 121 of the luminaire, such as a set of LEDs capable of emitting visible light, can serve as the signal source. As used herein, the term "light source" includes one or more devices that emit visible light unless specifically identified otherwise (for example, an "infrared light source"). The term "radio frequency" is to be construed herein to describe electromagnetic waves from about 100 kHz to 10 GHz. Radio frequency waves do not include infrared, visible, or ultraviolet light.

In certain embodiments, additional signal sources using various technologies such as radio frequency antennas; infrared, ultraviolet, or visible light sources; or speakers, ultrasonic emitters or other sound generators can also be included in the system 10. Such additional signal sources can provide means for measuring a variety of quantities useful for providing input to the remote driver 110. Such quantities may include motion, daylight, equipment-on status, presence of people, sound and noise, and the like. Sensors capable of receiving signals from the signal source(s) may also be included in the system 10. For example, if the luminaire light source is the sole signal source provided, then an optical sensor such as a photodiode, phototransistor, photoresistor, or any other type of photosensor, can be used as a suitable sensor. As another example, if an ultrasonic emitter is supplied with each luminaire or other fixture, then an ultrasonic detector can be supplied with each fixture to receive and detect the ultrasonic signals emitted by the emitter co-located in the same fixture as the detector as well as those co-located with other fixtures. Alternatively or in addition, each luminaire may be associated with a microcontroller or lighting adapter that serves as a luminaire controller. The microcontroller may be capable of transmitting the output of the sensors 122 to the remote driver 110. In certain embodiments, the microcontroller may control one or more of the installed signal sources. The microcontroller may or may not be able to directly control the power to the light source 121 of the luminaire. For example, the power to the light source 121 of the luminaire may be controlled instead by the remote driver 110. Microcontrollers can be dedicated to single luminaires or shared among two or more luminaires 120 or fixtures.

In one or more embodiments, "groups" of fixtures may be created to identify sets of fixtures that are to work together logically. For example, fixtures, such as the luminaires, controls (such as switches and dimmers), and sensors (such as motion sensors and daylight sensors), associated with a particular room can be assigned to a single group. Alternatively, the fixtures in the room may be assigned to multiple groups. In one example, fixtures associated with other rooms can be assigned to other groups so that each group corresponds to a room, hallway, or portion thereof, according to the illumination needs of the various spaces in the system. Such groups can be created automatically using the auto-commissioning methods of co-owned and co-pending U.S. patent application Ser. No. 12/538,806. Whether or not auto-commissioning is used, manual assignment of one or more fixtures may be made to one or more groups of fixtures.

In accordance with one or more embodiments, the remote driver can be placed into a special commissioning mode. The special commissioning mode can be entered via a user interface. A user can then view groups already created by auto-commissioning, create or edit names assigned to such groups (e.g., "Conference Room 1," "Break Room," "Second Floor Hallway," "Bob's Office," etc.), delete groups, and create new groups (initially without any assigned fixtures). Once a set of such groups has been created, the user can leave the remote driver and perform group assignments on-site at each group location. Additionally, new groups can be created on-site as described below.

If the user has no immediate need to enter any new information directly into the remote driver, then the special commissioning mode can be entered through any suitable interface available in the system 10. Examples of alternative means of entering the special commissioning mode include "gestures" made with pointing devices (see below), controls such as switches and dimmers, and sensors such as motion and presence sensors. Gestures can be created that are distinct from those that occur in normal use of the lighting system. For example, a wall switch may be used with a gesture comprising three or more rapid flashes that is distinct from normal on-off lighting control. Pointing devices may or may not produce special gestures to enter the special commissioning mode. In some examples, a pointing device generates a unique signal (as for some embodiments of the intelligent pointing devices described below), and no special gesture is produced. On the other hand, to use a simple flashlight pointing device, a special gesture can be useful to distinguish from random flashes of light. Such a special gesture can be created manually using any detectable pattern that is unlikely to occur by accident. For example, the user may point successively to the four corner fixtures already part of an existing group, or the user may point four times in close succession to an unassigned fixture. It is also possible to use a code card having slots in an opaque material or dark patches on a transparent material. Such a code card can be dragged in front of a flashlight or laser pointer to generate a unique code.

In one or more embodiments, the system can be secured against unauthorized entry into the special commissioning mode by requesting an administrative code or password for access. Such passwords can be transmitted encoded in gestures as described above. Special wall controllers with keypads can also be provided to enable authorized users to dial the administrative access code or password.

In one or more embodiments, the user may be provided with a handheld "pointing device" capable of pointing to fixtures in a way that can be detected by the sensor co-located with each fixture. Any signal source technology which is compatible with sensors provided with the fixtures can be used. Non-contact devices, such as infrared or visible light flashlights and laser pointers, ultrasonic or acoustic emitters, short-range radio wave devices such as those using BLUETOOTH™ and radio-frequency identification (RFID) technology, chemical sensors, etc., which are sufficiently directional or short-range to be able to single out individual fixtures, can be used, as long as at least one fixture has a sensor capable of detecting the signal. Contact devices can also be used, provided that each fixture has a sensor capable of detecting contact such as, for example, a capacitive or pressure sensitive touch sensor. Where compatible signal emitters and detectors are both present in the fixtures, then reflective or retro-reflective or even non-reflective objects can be used as pointing devices. Any object that can significantly change the amount of reflected signal returned to a detector in a fixture from its co-located signal emitter can be used as a pointing device, as long as the resulting detected signal change can be distinguished from the "noise" of other activities and signal sources such as the movement of the user and stray light sources. For example, the pointing device may include any visible light emitting device, such as a flashlight, laser pointer, a hand-held reflector, a display screen, a cell phone, a laptop, a personal digital assistant, a tablet computer or other touch screen device, or any other device that transmits visible light detectable by one or more of the sensors. The pointing device may or may not be hand-held. For example, the pointing device may include a display screen coupled to a desktop computer, which is wheeled around on a cart.

The lighting system 10 may include sensors, such as photosensors and microphones, that are used for purposes other than commissioning the system 10. For example, the lighting system 10 may include one or more daylight sensors used to determine what light level is in a particular lighting area. Microphones may be included for occupancy testing. Because the lighting system 10 may include photosensors that are used for purposes other than commissioning the system 10, the photosensors may also be leveraged to additionally detect a visible light signal from the pointing device. Alternatively or in addition, because the lighting system 10 may include microphones or other audio detecting devices for purposes other than commissioning the system 10, the audio detecting devices may be leveraged to additionally detect a signal from the pointing device. Thus, the costs and complexity of adding a sensor just for communication with the pointing device may be avoided. Accordingly, the central control unit may receive, from same photosensor, both (1) an indication of a light level in a room and (2) an indication that the sensor received a signal from the pointing device. Using a visible light signal from the pointing device may also provide the user operating the pointing device with a visual indication of where the pointing device is aimed. Furthermore, a flashlight or other visible light source may be a very inexpensive implementation of the pointing device.

In one or more embodiments, the user may point the handheld device at one fixture at a time and wait for the control unit to acknowledge the signal received. For example, the control unit can flash a light source (for example, a luminaire) as acknowledgement. In the context of acknowledgement, "flashing" one or more light sources can be performed by, for example, toggling the appropriate light source(s) on then off (or off then on, if already on) for an interval ranging from a few milliseconds to a few seconds. Alternatively or in addition, the control unit can ramp up and down the level of the appropriate light source(s) over similar time periods to provide a distinctive acknowledgement. Any number and variety of user "gestures" and remote driver responses can be implemented to facilitate commissioning tasks.

In one or more embodiments, a "dumb" pointing device may be used. Such a device may not include a means for encoding information other than the pointing action itself. For example, a flashlight pointing device can be used. Several gestures are possible in coordination with acknowledgement signals provided by the control unit. For example, a new group can be created by pointing sequentially to an unassigned fixture and then to other fixtures that are to be members of the group. A fixture can be removed from the group by pointing to that fixture again. Group membership can thereby be toggled on and off by repeatedly pointing at a particular fixture. For fixtures (such as switches and dimmers) that do not have signal sources that can be used to acknowledge pointing, the remote driver can provide such acknowledgement instead by, for example, flashing luminaires currently assigned to the group. For fixtures such as luminaires that can acknowledge pointing, the remote driver can provide both individual fixture acknowledgement by flashing the fixture, and group assignment by subsequently flashing the entire group. As an additional form of user feedback, the remote driver can also turn on luminaires in a group while that group is being processed. In this case, flashing of the group may momentarily turn off the members of the group. In order to move on to a new group, the user can point to a fixture already assigned to a different group. Alternatively or in addition, if an additional new group is to be created, a suitable waiting time can be used. For example, the remote driver can assume that any unassigned fixtures pointed to within intervals of less than a suitable predetermined interval or timeout, such as 30 seconds, is to be assigned to the current group. Pointing to an unassigned fixture after the predetermined interval has elapsed can be used as a gesture to indicate that a new group should be started. In one example, the predetermined interval can be set to be substantially longer than the average time between the gestures used to add or remove fixtures from a group.

In one or more embodiments, the user may provide a "confirmation" or "commit" signal before any change in group assignments is made. This additional signal can reduce the possibility of accidental changes. After a user points to a fixture, the remote driver may provide an acknowledgment signal indicating that a fixture has been chosen. The user may then point to the fixture again within a suitable time interval to confirm the selection before action (adding or removing the fixture from a group) is taken.

Auto-commissioning may result in undesirable fixture assignments. For example, the user may wish to move a boundary between two adjacent groups, because, for example, a new physical partition is installed after auto-commissioning was performed. In such situations, the user may not be able to see all fixtures that were assigned to the current group by auto-commissioning, and thus would not know of, or be able to see, all fixtures that should be removed from the current group. However, when checking fixture assignments on the other side of the partition, the user would notice that the incorrectly assigned fixtures were not assigned to the expected group on that side. The fixtures may then be reassigned correctly by pointing at the incorrectly assigned fixtures with the pointing device. If desired, the remote driver can respond with a unique acknowledgement signal (a different flash pattern, for example) to indicate a reassignment rather than a first assignment for that fixture.

The remote driver can also signal to the user that the timeout has expired by providing a special acknowledgement signal, such as a double flash. To resume making assignments to an existing group after the timeout (or at the beginning of a commissioning session), the user can point to any member of the group. The remote driver may acknowledge by flashing or increasing the light level of the entire group, initially without removing any fixture from the group. Alternatively, instead of waiting for the timeout period to expire before providing the special acknowledgement signal, the lights may switch from on (indicating that a group is being processed) to flashing to indicate that the timeout period will expire in a few seconds if no further action is taken. When the timeout period expires in this example, the lights may turn off or be set to a low level to indicate that processing of the group is no longer active.

New groups created on-site using the dumb pointing device may be unnamed, or the groups may have default names such as "Flashlight Group 1" and have additional flags set to indicate that the groups were created using manual commissioning. The user can note each new group so created on paper or other portable device such as a personal digital assistant (PDA) or laptop computer. When the user returns to the user interface at the remote driver, the user can be presented with a list of newly created groups in the order in which they were created, or in some other order, and names can then be assigned or edited according to the user's notes if desired.

In one or more embodiments, additional information can be sent to the remote driver by using an "intelligent" handheld/portable pointing device. Intelligent pointing devices may be capable of transmitting short codes which can increase the repertoire of gestures that are available. Custom intelligent pointing devices can be built as a custom device. Alternatively or in addition, the intelligent pointing devices may be implemented using software running on general purpose handheld computing devices, such as PDAs, cell phones with computing capabilities, or laptop computers. In some embodiments, a signal emitter may be added as an attachment to an I/O port; in other embodiments, existing built-in signal sources can be used. Examples of built-in signal sources include display screens, infrared communications links, and the LED in an optical mouse. Intelligent pointing devices can provide either one-way or two-way communications as described below.

The intelligent pointing device can facilitate a user creating, naming, and selecting groups. When a particular group is selected, a unique identifying code can be repeatedly transmitted by the intelligent pointing device, for example, by low-frequency modulation of light emission. In one or more embodiments, one-way communication between the intelligent pointing device and the fixtures may be provided, wherein the intelligent pointing device emits a code that can be detected by the sensors co-located with each fixture. The remote driver may detect the code received at a particular fixture and respond by assigning that fixture to the group associated with that code or removing that fixture from the group associated with that code. The control unit may provide acknowledgement signals similar to those described above in connection with dumb pointing devices. The timeout may not be suitable for identification of new groups in such groups. Instead, the user can select a new group on the intelligent pointing device, for example, and subsequent adding and removing gestures may apply to the new group.

In one or more embodiments, if the pointing device facilitates the user entering names for groups, then these names can be uploaded to the controller via a separate gesture, either directly to the control unit or indirectly via any fixture. Uploads from the intelligent pointing device can be made using any available communications technology. Examples include wireless networking ("WIFI"), USB wired links, infrared wireless links, cellular telephone data links, and communication via the sensors built-in to the fixtures. Some of these communications modes may enable pointing devices to be always "on-line" (i.e., connected to the remote driver); alternatively or in addition, the pointing device may be later connected to the remote driver for data upload (i.e., some fixture commissioning functions such as group naming may be performed "off-line," and the data may be uploaded later to the remote driver).

In one or more embodiments, the control devices and/or the sensors in the system 100 can be used to indicate that a different group is being processed. For example, when a motion sensor associated with a different group detects that the user has moved to a new area, the fixtures assigned to that group may be flashed as an acknowledgement, and the user can begin adding or removing fixtures from that different group. Similarly, the user can toggle a switch or adjust a dimmer control that is not assigned to the current group to indicate that he now wishes to process a different group. Toggling a switch or adjusting a dimmer control that is already a member of the current group can also be used as a gesture to indicate that the user is finished processing that group.

In one or more embodiments, the intelligent pointing device can also be equipped to provide two-way communication with fixtures. Any suitable communications method or methods can be used. For example, optical links can be used. The use of an optical signal source in the pointing device has been described above. The intelligent pointing device can also be provided with an optical sensor. A simple photoresistor, photodiode, phototransistor, or any other photosensor can be used, or if the pointing device has a built-in camera (as, for example, a cell phone), the camera can be used as the optical sensor.

To use two-way communication, after auto-commissioning, for example, the system 10 can be placed into the special commissioning mode. The fixtures associated with each group in the system can be set to emit unique codes that can be detected by the intelligent pointing device. For example, the codes can be emitted as low-frequency amplitude modulation of the luminaire light sources. Any suitable modulation can be used. A preferred embodiment uses a modulation which can be easily detected by the intelligent pointing device but is not annoying to persons in the area. For example, a modulation between two non-zero light levels at about 20-30 Hz can be used—slow enough so that a video camera can be used to detect the modulation but at levels that are not annoying to persons in the area. Higher frequency modulation can be used with intelligent pointing devices that are capable of detecting such frequencies.

The intelligent pointing device can detect the code to determine which group is to be processed, and the user can proceed to add or remove fixtures from the group. The user can also name the group or match the group to a predefined name from a location list that may, for example, have been defined from a floor plan of the system.

Figure 2:
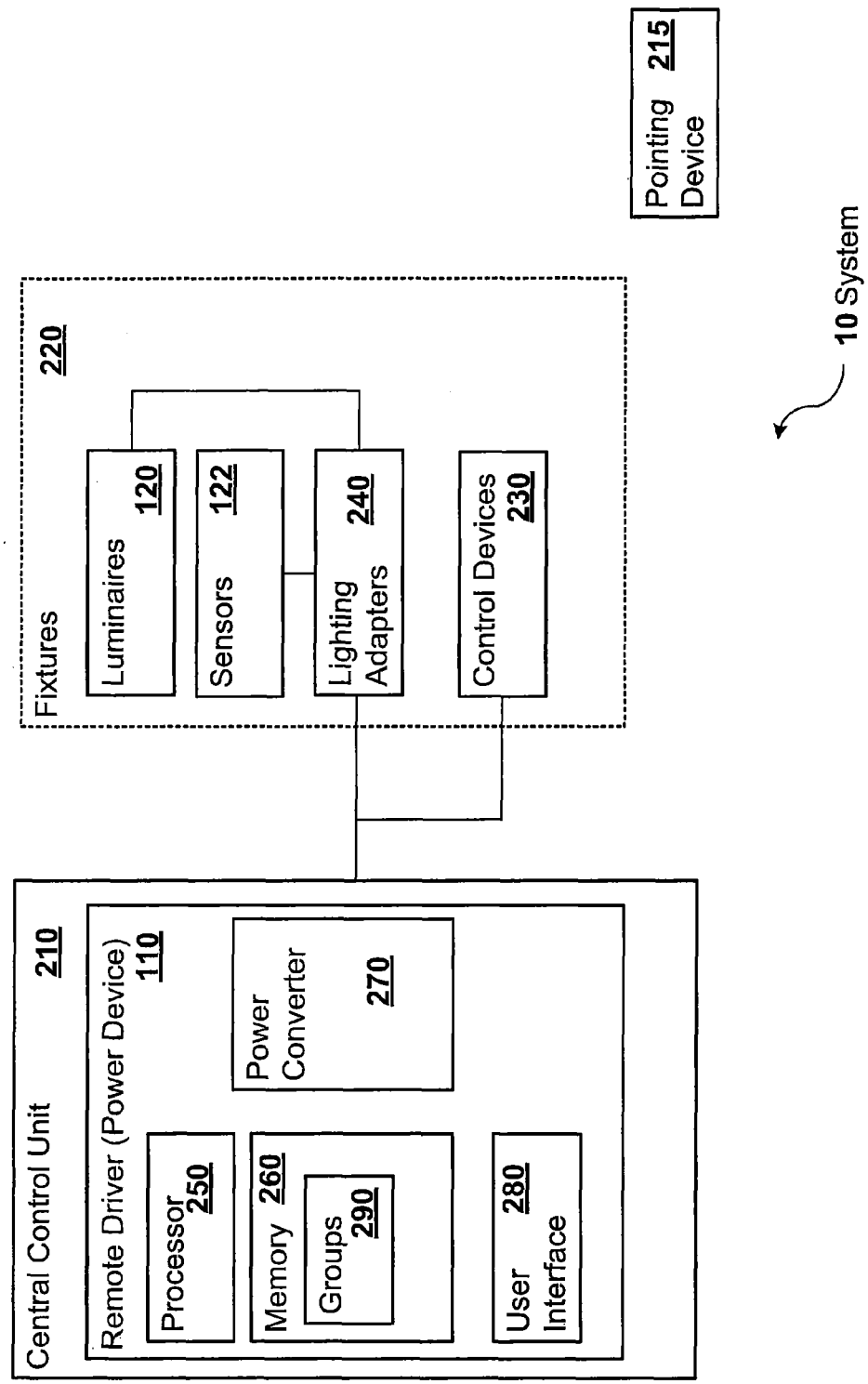
FIG. 2 illustrates an example of a hardware diagram of a lighting system.

FIG. 2 illustrates an example of a hardware diagram of the lighting system 10. The system 100 may include a central control unit 210, a pointing device 215, and fixtures 220, such as the luminaires 120, the sensors 122, and control devices 230. The system 100 may include additional, fewer, or different components. For example the system 100 may include lighting adapters 240 that provide a mechanism for the sensors 122 and/or the luminaires 120 to communicate with the central control unit 210.

The central control unit (or simply "control unit") 210 may include the remote driver 110, which may also be referred to as a power device 110. The power device 110 may be any device or combination of devices that powers the fixtures 220 and communicates with the fixtures 200 and/or devices electrically coupled to the fixtures 220. The power device 110 may provide power to one or more of the fixtures 220 over a pair of conductors. The power device 110 may provide power to, and communicate over, the same conductors. Alternatively or in addition, the power device 110 may communicate over different conductors than are used to power the respective fixtures 220.

The power device 110 may include a processor 250, a memory 260, a power converter 270, and a user interface 280. The power device 110 may include additional, fewer, or different components. For example, the power device 110 may not include the user interface 280.

The memory 260 may include any now known, or later discovered, data storage device, component or combination thereof. The memory 260 may include nonvolatile and/or volatile memory, such as a random access memory (RAM), a read-only memory (ROM), an erasable programmable read-only memory (EPROM), flash memory, or any other type of electronic storage component. Alternatively or in addition, the memory 260 may include an optical, magnetic (hard-drive) or any other form of data storage device.

The processor 250 may include a microcontroller, a general processor, a central processing unit, a server, an application specific integrated circuit (ASIC), a digital signal processor, a field programmable gate array (FPGA), a digital circuit, an analog circuit, or combinations thereof.

The processor 250 may be operable to execute computer executable instructions or computer code embodied in the memory 260 or in other memory to implement the functionality of the power device 110. The computer code may include instructions executable with the processor 250. The computer code may be written in any computer language now known or later discovered, such as C++, C#, Java, Pascal, Visual Basic, Perl, HyperText Markup Language (HTML), JavaScript, assembly language, and any combination thereof. In one example, the memory 260 may include an operating system, such as LINUX®, a registered trademark of individual, William Croce of Boston, Mass.

The memory 260 may hold the programs and processes that implement the logic described above for execution by the processor 25Q. The memory 260 may include supporting structures, such as groups 29Q of the fixtures 220 that identify which of the fixtures 220 are members of the respective groups 290.

The lighting adapters 240 may include a device that communicates with the control unit 210. For example, each one of the lighting adapters 240 may relay information received from a corresponding one of the sensors 122 to the control unit 210. Each one of the lighting adapters 240 may be co-located with a corresponding one or more of the fixtures 220. Alternatively or in addition, each one of the lighting adapters 240 may be co-located with a corresponding one or more of the sensors 122. Each one of the lighting adapters 240 may include a processor and a memory, such as the processor 250 and the memory 260 in the power device 110. Each one of the lighting adapters 240 may include hardware for communication, such as a network interface controller (NIC) or other device.

The user interface 280 may include any mechanism for a user to interact with the central control unit 210 or the remote driver 110. The user interface 280 may include computer executable instructions, one or more devices, or a combination thereof. Examples of devices that may be included in the user interface 280 include a touch screen, a display device, a mouse, and a keyboard. The user interface 280 may include a graphical user interface (GUI). The GUI may offer graphical icons, and visual indicators as opposed to text-based interfaces, typed command labels or text navigation to fully represent the information and actions available to a user. The actions may be performed through direct manipulation of the graphical elements. More generally, a user interface is software, hardware, or a combination thereof through which people—users—interact with a machine, device, computer program or any combination thereof. In one example, the user interface 280 may include a web server that is accessed by a user from the power device 110 or from some other device. Alternatively or in addition, a computing device distinct from the central control unit 210 may include the user interface 280 and be in communication with the central control unit 210. For example, the pointing device 215 may include the user interface 280.

The power converter 270 may include any circuit that powers one or more of the fixtures 220. Examples of the power converter 270 include a switched-mode power supply, an AC to DC (Alternating Current to Direct Current) converter, a DC to DC (Direct Current to Direct Current) converter, a fixed-frequency PWM converter, a variable-frequency quasi-resonant ZCS/ZVS (zero-current switching/zero-voltage switching) converter, a voltage converter, a current converter, a hysteretic converter, a PWM buck converter, and any other suitable power source.

The central control unit 210 may include additional, fewer, or different components than illustrated in FIG. 2. For example, the central control unit 210 may not include the power device 110. In one example, the central control unit 210 may communicate with the sensors 122, but not directly power the fixtures 220. Accordingly, the central control unit 210 may include, for example, the processor 25Q, the memory 260 and the user interface 280, but not the power converter 270. Alternatively or in addition, the central control unit 210 may communicate with the power device 110. In a second example, the central control unit 210 may include a signal source, a sensor, a wireless communication component, a network interface controller, or any other communication device, or a combination thereof. Accordingly, the pointing device 215 may communicate directly with the central control unit 210. For example, the pointing device 215 may communicate directly with the central control unit 210 using visible light, infrared, radio communications, Ethernet, WIFI™, or any other mechanism of communication. In one or more examples, references to "the remote driver" or the "power device" above may be applicable to "the central control unit."

In one or more examples, the central control unit 210 may be in communication with additional central control units. Together, the central control units may coordinate the process of commissioning the fixtures 220.

Each one of the sensors 122 may include a device that detects one or more physical characteristics, such as light, audio, or radio waves. Examples of the sensors 122 may include an optical sensor such as a photodiode, phototransistor, photoresistor, or any other type of photosensor; a microphone, an ultrasonic detector, or any other device that detects audio signals; a radio-frequency identification (RFID) device, a short-range radio wave device such as a WIFI™ or BLUETOOTH™ compliant device; or any other device that detects a signal.

The pointing device may include a device that generates a signal that may be detected by one or more of the sensors 122. Examples of the pointing device 215 may include any visible light emitting device, such as a flashlight, a laser pointer, a hand-held reflector, a display screen, a cell phone, a laptop, a tablet computer or other touch screen device, a personal digital assistant, a reflective or retro-reflective or even non-reflective object, or any other device that transmits visible light; an ultrasonic emitter, a speaker or any other type of acoustic signal generator; a short-range radio wave device such as a WIFI™ or BLUETOOTH™ compliant device, a chemical sensor; or any other device that detects a signal that is sufficiently directional or short-range to be able to single out individual fixtures. Thus, the pointing device 215 may be a simple device, such as a flashlight. Alternatively, the pointing device 215 may include a processor and a memory, such as the processor 250 and the memory 260 in the control unit 210.

The pointing device 215 may include additional, fewer, or different components. For example, the pointing device 215 may include a sensor for bi-directional communication with the fixtures 220. Alternatively or in addition, the pointing device 215 may include a database, a memory, or any other storage mechanism on which commissioning information is stored.

During operation of the system 10, the system 10 may create one or more of the groups 290 of the fixtures 220 in the memory 260 of the central control unit 210, in a memory of the pointing device 215, or in some other memory. The groups 290 of fixtures may be control groups. The fixtures 220 in a control group may be controlled as group. If the control group contains luminaires 120 and control devices 230, such as a wall switch or a dimmer switch, then the control devices 230 may control the luminaires 120. Alternatively or in addition, the system 10 may associate the control group with one or more of the control devices 23Q without including the control device or control devices in the control group. Alternatively, the control group may not include, or be associated with, any of the control devices 230. Alternatively or in addition, the control group may be a motion sensor group. A motion sensor group may include or be associated with one or more of the sensors 122, such as an occupancy sensor or a photosensor.

Alternatively or in addition, the system 10 may map an identity of a fixture or group of fixtures to a data structure that describes a physical location. For example, the identity may include a fixture address that identifies a particular one of the fixtures 220, or an identifier of one or more of the groups 290 of the fixtures 220. Examples of the data structure that describes one or more physical locations may include a listing of the rooms in a building, a location tree that describes a hierarchical relationship of locations (such as buildings, which may include floors, which may in turn include rooms), an architectural drawing of a site, or any other area identifier or area identifiers. Alternatively, the identity of the fixture or group of fixtures may not be mapped to a data structure that describes a physical location. In one or more examples, the group of fixtures 220 may correspond to a physical location, a motion sensor group, and a wall switch group. A motion sensor group may be a control group that is controlled based on an output of one or more motion sensors. A wall switch group may be a control group that is controlled based on the state of one or more wall switches.

In one example, the system 10 may perform auto-commissioning as described in co-pending U.S. patent application Ser. No. 12/538,806, filed Aug. 10, 2009, entitled LIGHTING SYSTEMS AND METHODS OF AUTO-COMMISSIONING. The system 10 may use signal sources, such as the light sources 121, and/or the sensors 122 that may be co-located with corresponding fixtures 220 in order to automatically determine, for example, distance and relative positions of the fixtures 220 to each other. One or more of the signal sources co-located with a corresponding one of the fixtures 220 may generate a signal. Any one of the fixtures 220 for which the corresponding sensor detects the generated signal may be grouped with the fixture whose signal source generated the signal. The control unit 210 may determine distance vectors by determining which of the sensors 122 detected the signals generated by the signal sources. The distance vectors may include the relative position information. For example, the distance vectors may include the distance between the sensor and the signal source and the relative direction. The control unit 210 may determine the groups 290 from the distance vectors. The groups 290 formed from the distance vectors may serve as an initial set of groups that may be updated based on one or more of the gestures described herein that are detected by the sensors 122.

The system 10 may modify or create groups in many different ways. In a first example, the pointing device 215 may be an intelligent pointing device, such as a laptop, that stores commissioning information, which is subsequently uploaded into the central control unit 210. The intelligent pointing device may include a description of the physical locations in a database. The database may include identifying information, such as a fixture list, fixture identifiers, group identifiers, an identifier of the control unit 210, and an identifier of a channel that powers the fixture or fixtures. Alternatively or in addition, the pointing device 215 may receive the identifying information from the signal sources co-located with the fixtures 220. Alternatively or in addition, the pointing device 215 may download the identifying information over a communications network prior to beginning to commission the fixtures 220. A user may interact with the intelligent pointing device as the groups are modified or created, and associate each group with a particular physical location. The pointing device 215 may store the commissioning information in the database while the fixtures 220 are commissioned. The commissioning information may be uploaded later from the pointing device 215 to the central control unit 210. In a second example, the pointing device 215 may not include a processor or a memory, and, instead, the central control unit 210 may store the commissioning information during the commissioning of the fixture 220. For example, a user may perform a walkthrough in which the user moves through a building in a predetermined sequence of physical locations. By moving in the predetermined sequence, the control unit 210 may associate each group with the corresponding physical location in the predetermined sequence of locations. In a third example, both the pointing device 215 and the central control unit 210 may store at least a portion of the commissioning information as the fixtures 220 are commissioned.

In one embodiment, the system 10 may be a distributed system instead of a system centered at the control unit 210 or a combination of control units. For example, the system 10 may be implemented as a peer-to-peer network, where the lighting adapters 240 are nodes in the peer-to-peer network. In one or more examples, devices other than the lighting adapters 240, such as the control unit 210, may be nodes in the peer-to-peer network. Each one of the lighting adapters 240 may communicate with one or more of the other lighting adapters 240 over a communications network. The communications network may include devices such as the power device 110, the control unit 210, network routers, and switches, as well as interconnects, such as wiring and cables. The communications network may include a local area network (LAN), a wireless local area network (WLAN), a personal area network (PAN), a wide area network (WAN), the Internet, any other communications network, or any combination thereof.

Each one of the nodes may be assigned a node identifier. For example, the node identifier may include a serial number, a GUID (globally unique identifier), a network address, a network name, or any other identifier. Alternatively or in addition, each one of the fixtures 220 may be assigned a fixture identifier. Alternatively or in addition, each one of the sensors 122 may be assigned a sensor identifier. The groups 290 may be stored, for example, in a distributed hash table (OUT) or stored using some other decentralized distributed system. A key in the DHT may be generated from a group identifier that identifies a group of the fixtures 220. A value in the DHT corresponding to the key may include the node identifiers that identify the nodes in the group, fixture identifiers that identify the fixtures 220 in the group, or a combination thereof.

If one or more nodes in a group detect a gesture indicating that the group is being commissioned, then one or more of the nodes in the group may broadcast a message that indentifies the group as the group currently being commissioned. The message may include the group identifier, an identifier of a node currently in the group, an identifier of any of the fixtures 220 currently in the group, or a combination thereof. Subsequently, a node that detects an add gesture may be added to the current group. For example, the node that detects the gesture may generate the key and update the DHT value corresponding to the group to include the node that detected the add gesture. Alternatively or in addition, one or more of the nodes that are in the group prior to detection of the add gesture may update the DHT value corresponding to the group. Similarly, a node that detects a remove gesture may be removed from the current group.

The nodes in the group may negotiate a master node for the group. Thereafter, the master node may control the fixtures 220 associated with the group. For example, the master node may control the light level generated by the luminaires 120 in the group. Alternatively or in addition, the master node may control the light level in accordance with input received from one of the control devices 230 in the group. For example, the lighting adapter that is electrically coupled to a dimmer switch may receive a light level indicator from the dimmer switch and direct the power device 110 to supply each one of the luminaires 120 in group with a suitable amount of power. Alternatively or in addition, the lighting adapter coupled to the dimmer switch may transmit the light level indicator to the other nodes in the group, which, in turn, request a suitable amount of power from the power device 110. Similarly, the master node may receive a measurement of light in a lighting area from one or more of the sensors 122 in the group. The master node may determine the suitable amount of power from the power device 110 from a combination of the light level indicator from the dimmer switch and from the measurement of light in the lighting area.

In one example, the nodes in the group may not negotiate a master node. Instead, the node in the group that is electrically coupled to a sensor may transmit information received from the sensor to the other nodes in the group. Similarly, the node in the group that is electrically coupled to a control device may relay information received from the control device to the other nodes in the group. Each one of the nodes in the group may request a suitable amount of power.

The system 10 may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include non-transitory media, such as volatile and/or in-volatile memory, hard disks, floppy disks, CD-ROMs, or any other computer storage device. Alternatively or in addition, the components, such as the processor 250, the lighting adapters 240, and the power converter 270, may be implemented as a microprocessor, a microcontroller, a DSP, an application specific integrated circuit (ASIC), a discrete electronic component, any other type of circuit or logic, or any combination thereof.

The processing capability of the system 10 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)).

Figure 3:
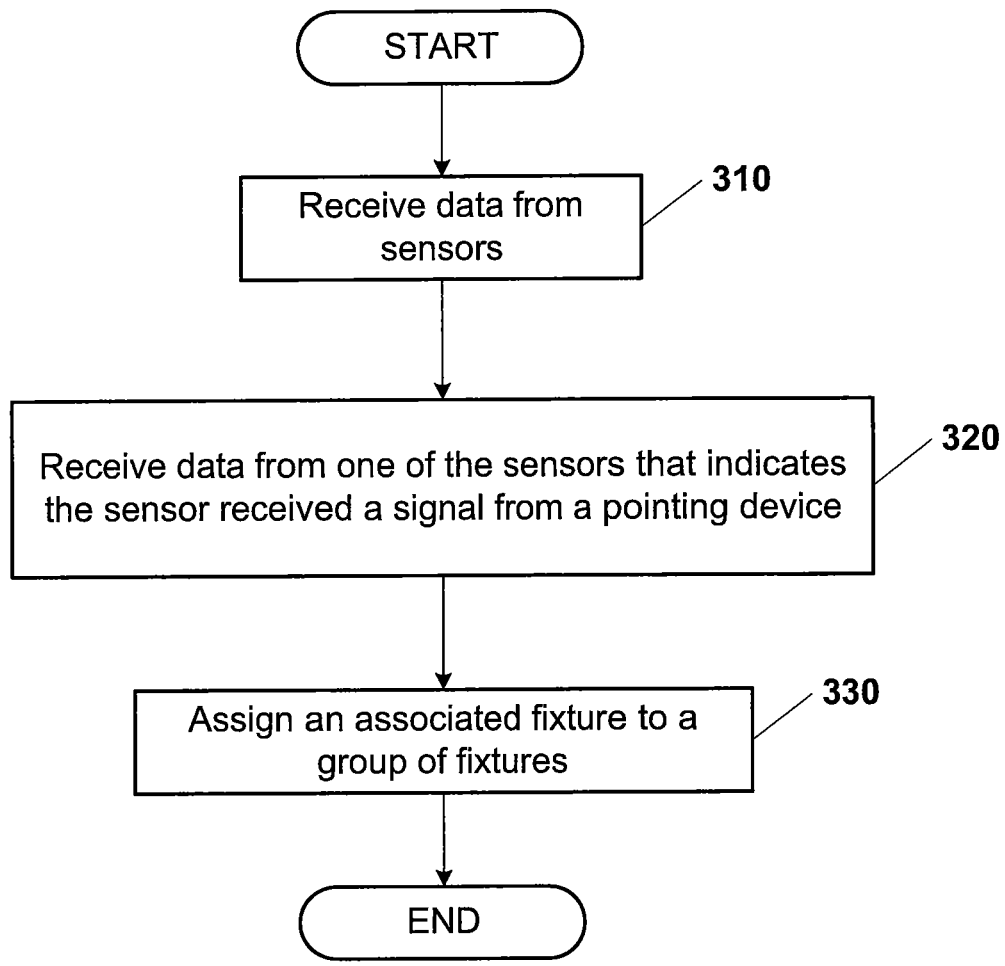
FIG. 3 illustrates an example flow diagram of the logic of a lighting system.

FIG. 3 illustrates an example flow diagram of the logic of the system 10. The logic may include additional, different, or fewer operations. The operations may be executed in a different order than illustrated in FIG. 3.

Data may be received from the sensors 122 (310). In one example, the sensors 122 may include photosensors, where each one of the photosensors is associated with a corresponding one of the fixtures 220. In a second example, the sensors may include audio sensors associated with the fixtures 220. A sensor may be associated with a corresponding fixture if, for example, the sensor is co-located with the corresponding fixture, is electrically coupled to the corresponding fixture, or is manually associated with the corresponding fixture. The association may be stored in the memory 260 of the control unit 210. Alternatively or in addition the association may be stored in a memory of one or more of the lighting adapters 240. The data may be received by the processor 250 in the control unit 210, a processor in the lighting adapter, or both.

The data received from one or more of the sensors 122 may indicate that the sensor received a signal from the pointing device 215 (320). For example, the signal may be a visible light signal or an audio signal generated by the pointing device 215.

A fixture associated with the sensor that received the signal from the pointing device 215 may be assigned to a group of the fixtures 220 in response to receipt of the data from the sensor (330). The operation may end by, for example, updating the group of the fixtures 220 in the memory 260 to include the fixture associated with the sensor.

Figure 4:
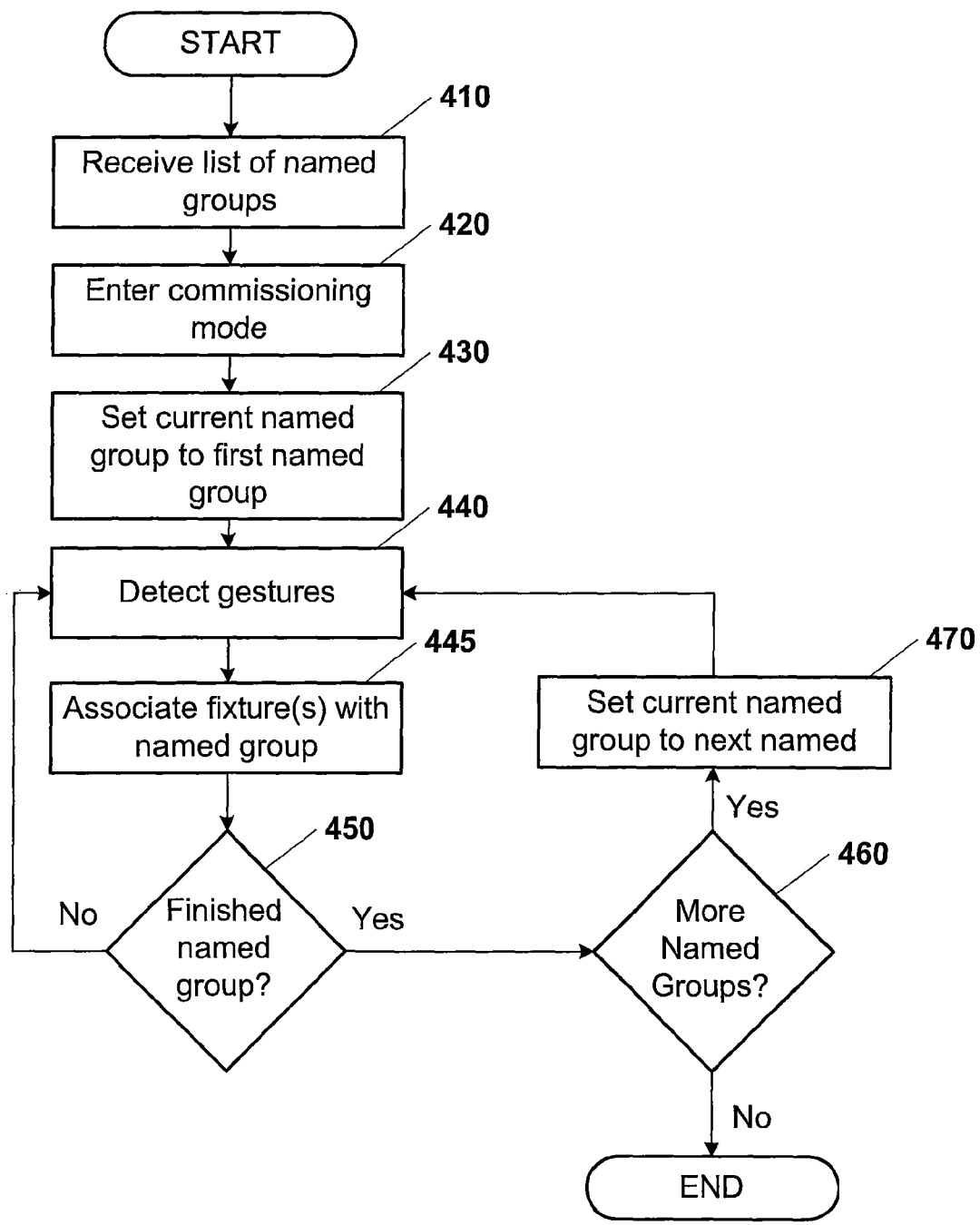

FIG. 4 illustrates an example flow diagram of the logic of the system 10 for commissioning the fixtures 220 with a walkthrough. The operations may begin with a list of named groups being received (410). For example, the control unit 210 may receive the list of named groups through the user interface 280 or through some other source, such as over a communications network, through one of the sensors 122, or any combination thereof. A named group may include a name of a control group, a logical group, a physical location, a room, a subset of a room, a lighting area, or any other type of area or logical grouping. Alternatively or in addition, the control unit 210 may receive a fixture count for each named group. The fixture count may indicate how many of the fixtures 220 are—or should be—in the named group. The list of named groups and corresponding fixture counts may be determined from a floor plan, an architectural drawing, a visual inspection of a site, or any other source or combination of sources.

The list of named groups may include an ordered list. The list of named groups may be stored in the memory 260 of the control unit 210, the memory of the pointing device 215, or in some other memory or combination thereof.

The operations may continue with the system 10 entering a commissioning mode (420). Alternatively, the operations may not include entering the commissioning mode. The commissioning mode may be a mode in which the system 10 detects gestures and assigns or re-assigns the fixtures 220 to the groups 290 in response to the gestures. When not in commissioning mode, the system 10 may detect a limited number of gestures or, for example, no gestures at all, in order to decrease the possibility that the system 10 inadvertently detects a gesture, where no gesture is actually made. In one example, the system 10 may enter the commissioning mode in response to selection of a user control, such as a button, in the user interface 280. In a second example, the commissioning mode may be entered in response to a commissioning mode gesture being detected by one or more of the sensors 122 or control devices 230. In a third example, the commissioning mode may be entered in response to detecting an occupant with one of the sensors 122. In a fourth example, the commission mode may be entered in response to completion of auto-commissioning of the fixtures 220. In commissioning mode, a current named group index may be maintained by the system 10. The current named group index may identify a named group in the list of named groups that is currently being commissioned by the system 10.

The operations may continue with the current named group index being set to identify a first named group in the ordered list of named groups (430). For example, the control unit 210 may store an identity of the first named group in the memory 260 of the control unit 210. The current named group index may be set, for example, in response to entering the commissioning mode. A user may walk to a physical location that corresponds to the first named group.

The operations may continue with gestures being detected by the sensors 122 that are located in one or more physical locations that correspond to the current named group (440). The fixtures 220 in the current named group may be modified and/or verified in response to detection of the gestures. For example, a user commissioning the system 10 may walk through a physical site in the order of the list of named groups. The user may commission the group or groups 290 of fixtures in each named group before moving on to the next named group.

Accordingly, gestures first detected after entering the commissioning mode may be detected by sensors in or associated with the first named group. For example, a user may enter a room, point the pointing device at the sensor that is associated or co-located with one of the fixtures 220 in the room. The luminaires 120 in the group that includes the fixture associated with sensor may flash, thereby indicating that the luminaires 120 are in the group. If no other changes to the group are desired, then the group may be considered verified. Therefore, the fixture or the fixtures 220 added in response to detected gestures while the current named group index is set to a particular value may be included in the named group identified by the current named group index (445).

The operations may continue by determining whether commissioning of the fixtures 220 in the current named group is finished (450). In one example, if a room close gesture is detected, then commissioning the fixtures 220 in the current named group may be finished. A room close gesture may include a gesture that indicates the commissioning of the fixtures 220 at the current named group is finished. In a second example, if the total number of fixtures 220 in the current named group matches the fixture count for the current named group, then the commissioning of the fixtures 220 in the current named group may be finished. In a third example, if an occupancy sensor in or associated with the current named group detects an occupant leaving, then the commissioning of the fixtures 220 for the current named group may be finished. In a fourth example, if an occupancy sensor not in the current named group detects an occupant, then the commissioning of the fixtures 220 in the current named group may be finished. In a fifth example, any combination of the mechanisms described above may indicate whether commissioning of the fixtures 220 in the current named group is finished.

In response to a determination that the commissioning of the fixtures 220 at the current named group is not finished, the operation may return to detecting gestures (440). Alternatively, if commissioning the fixtures 220 in the current named group is finished, then the operations may proceed by determining whether any more named groups are left to commission (460). If commissioning the fixtures 220 at the current named group is determined to be finished, but the number of fixtures 220 in the current named group does not match the fixture count, then an error condition may be indicated by, for example, flashing the luminaires 120.

The operations may continue by determining whether any more named groups are to be commissioned (460). For example, if all of the named groups have been associated with or include the fixtures 220 while in the commissioning mode, then there may not be any remaining named groups to commission. Alternatively or in addition, a commissioning complete gesture may be detected. Alternatively or in addition, a selection in the user interface 280 may indicate that no more named groups are to be commissioned. If more named groups are to be commissioned, then the current named group index may be set to identify a next named group in the sequence of named groups (470) and the operations may return to detecting gestures at the next named group (440).

Alternatively, if the named groups in the list of named groups are commissioned or the commissioning of the fixtures 220 is otherwise finished, then the operations may end, for example, by the system 10 exiting the commissioning mode. If the list of named groups includes a list of physical locations, then the groups 290 of fixtures may be associated with a list of physical locations when the walkthrough is complete. Thus, the system 10 may determine the location of any particular fixture, or identify and control any of the fixtures 220 at a particular location.

The logic may include fewer, additional, or different operations than illustrated in FIG. 4. For example, the operations may not include entering the commissioning mode (420). In one or more examples, the operations may include associating the fixtures 220 with the lighting adapters 240. For example, the list of named groups may include a list of fixtures. The list of fixtures may include fixture information about one or more of the fixtures 220, such as a fixture type. The fixture type may identify the type of the fixture and/or the type of the lighting adapter that is electrically coupled to the fixture. The fixture type may include, for example, a model name, a model number, a manufacturer name, and any other descriptive information. The lighting adapter may detect a gesture received by the sensor that is electrically coupled to the lighting adapter. In response, the lighting adapter or the fixture may be associated with a current fixture in the fixture list. An acknowledgment of a successful association may include flashing the fixture, flashing a LED electrically coupled to the lighting adapter, playing a sound, or providing any other suitable feedback. Alternatively or in addition, the current fixture may be adjusted to the next fixture in the fixture list. Thus, in one example, the user may perform a gesture for each one of the fixtures 220 in an order determined by the list of fixtures. As a result, fixture information, such as a fixture type, may be associated with each of the fixtures 220. Alternatively or in addition, the fixture information may include a corresponding identifier of a physical location. Accordingly, a physical location of each of the fixtures 220 may be assigned to each respective one of the fixtures 220.

When starting the walkthrough, the list of named groups may or may not include any of the fixtures 220. For example, the list of named groups may be populated by auto-commissioning the fixtures 220 before performing the walkthrough. During the walkthrough, the named groups may be verified and/or modified using gestures described above. The walkthrough may be conducted in any particular order, and the list of named groups may or may not be ordered.

The operations may be executed in a different order than illustrated in FIG. 4. For example, the fixture or fixtures 220 may be associated with the current named group (445) before, after, or both before and after checking whether commissioning the current named group is finished (450).

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or nonvolatile memory such as ROM and RAM, or any other suitable storage device. Moreover, the various modules and screen display functionality is but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

That which is claimed is:

1. A method of commissioning a lighting system that includes a central control unit, a plurality of light sources that are remote from the central control unit and a plurality of sensors, each of the sensors being associated with one or more of the light sources, the method comprising:
    entering a command that sets the central control unit into a commissioning mode with a first light source group of a plurality of light source groups selected;
    transmitting light from a pointing device to a first sensor that is associated with a first of the light sources to select the first of the light sources for inclusion in the first light source group;
    transmitting light from the pointing device to a second sensor that is associated with a second of the light sources to select the second of the light sources for inclusion in the first light source group;
    selecting a second light source group;
    transmitting light from a pointing device to a third sensor that is associated with a third of the light sources to select the third of the light sources for inclusion in the second light source group;
    wherein the central control unit is configured to associate the first and second light sources with the first light source group based on receiving, over first and second pre-established hard-wired communication links, respective first and second signals from the first and second sensors indicating that the transmitted light from the pointing device was received at the first and second sensors while the central control unit was set in the commissioning mode with the first light source group selected, and the central control unit is further configured to associate the third light source with the second light source group based on receiving, over a third pre-established hard-wired communication link, a third signal from the third sensor indicating that the transmitted light from the pointing device was received at the third sensor while the central control unit was set in the commissioning mode with the second light source group selected.

2. The method of claim 1, wherein the pre-established hard-wired communication links are used to transmit information regarding light levels from the first through third sensors to the central control unit to control light levels of the first through third light sources during normal operation of the lighting system.

3. The method of claim 1, further comprising transmitting light from a pointing device to a fifth sensor that is associated with a fixture other than a light source to select the fixture for inclusion in the first light source group.

4. The method of claim 3, wherein the fixture comprises a switch or a dimmer.

5. The method of claim 1, further comprising receiving an acknowledgement from the first light source in the form of a change in an amount of light emitted by the first light source that indicates that the first light source has been selected for inclusion in the first light source group.

6. The method of claim 1, wherein the central control unit includes a remote driver that powers at least one of the first through third light sources.

7. The method of claim 6, wherein the remote driver powers the first through third light sources over the respective first through third pre-established hard-wired communication links.

8. The method of claim 1, further comprising selecting the first light source group by receiving a user selection of the first light source group.

9. The method of claim 1, further comprising selecting the second light source group by receiving a gesture at one of the sensors from the pointing device, wherein the gesture is a gesture that indicates the formation of a new light source group.

10. The method of claim 1, wherein the pointing device is located remotely from the central control unit when the pointing device is used to select the first light source for inclusion in the first light source group.

11. The method of claim 1, further comprising using the first and second sensors to determine light levels in respective first and second areas.

12. The method of claim 1, wherein the second light source group is selected after receiving the first and second signals from the first and second sensors and after associating the first and second of the light sources with the first light source group, but before receiving the third signal from the third sensor.

13. A method of operating a lighting system that includes a central control unit, a plurality of light sources that are remote from the central control unit and a plurality of sensors, each of the sensors being associated with one or more of the light sources, the method comprising the following operations that are performed by the central control unit:
   entering a commissioning mode for a first light source group in response to receiving a command from a user;
   receiving a first signal from a first sensor that is associated with a first of the light sources over a first pre-existing wired connection between the first sensor and the central control unit in response to the first sensor receiving light from a pointing device that is located remotely from the central control unit;
   associating the first of the light sources with the first light source group in response to receiving the first signal from the first sensor while the first light source group is selected;
   receiving a second signal from a second sensor that is associated with a second of the light sources over a second pre-existing wired connection between the second sensor and the central control unit in response to the second sensor receiving light from the pointing device;
   associating the second of the light sources with the first light source group in response to receiving the second signal from the second sensor while the first light source group is selected;
   receiving from a user a selection of a second light source group;
   receiving a third signal from a third sensor that is associated with a third of the light sources over a third pre-existing wired connection between the third sensor and the central control unit in response to the third sensor receiving light from the pointing device; and
   associating the third of the light sources with the second light source group in response to receiving the third signal from the third sensor while the second light source group is selected.

14. The method of claim 13, the method further comprising:
   receiving a fourth signal from a fourth sensor that is associated with a switch over a fourth wired connection between the fourth sensor and the central control unit in response to the fourth sensor receiving light from the pointing device; and
   associating the switch with the second light source group in response to receiving the fourth signal from the fourth sensor.

15. The method of claim 13, the method further comprising controlling the first light source to transmit an acknowledgement in response to receiving the first signal from the first sensor.

16. The method of claim 15, wherein the acknowledgement comprises a flashing of the first light source.

17. The method of claim 13, wherein central control unit includes a remote driver that powers at least one of the first through third light sources over one of the first through third wired connections.

18. The method of claim 13, further comprising receiving from the user a selection of the first light source group prior to receiving the first and second signals from the first and second sensors.

19. The method of claim 13, the method further comprising:
   exiting the commissioning mode in response to receiving a command from the user; and
   using the first and second sensors to determine light levels in respective first and second areas during operation of the lighting system.

20. The method of claim 13, wherein entering a commissioning mode for a first light source group in response to receiving a command from a user comprises entering the commissioning mode in response to the user selecting the first light source group from a listing of the plurality of light source groups on a display device.

\* \* \* \* \*